April 17, 1928.
M. V. VENTRELLA
1,666,274
AUTOMATIC ROTARY BOOK DISPLAY DEVICE
Filed April 18, 1927　　2 Sheets-Sheet 1
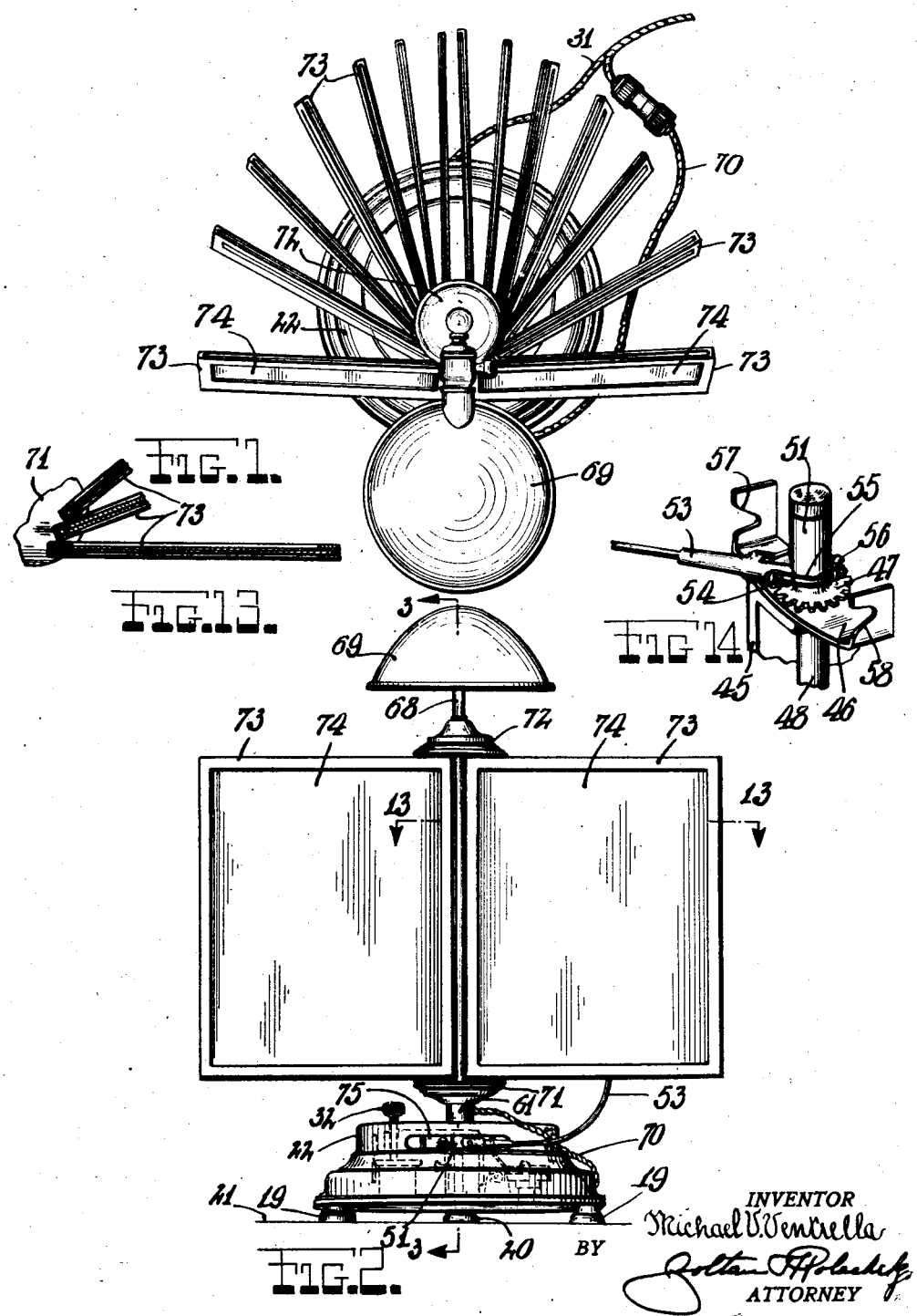
INVENTOR
Michael V. Ventrella
BY
ATTORNEY April 17, 1928.
M. V. VENTRELLA
1,666,274
AUTOMATIC ROTARY BOOK DISPLAY DEVICE
Filed April 18, 1927   2 Sheets-Sheet 2
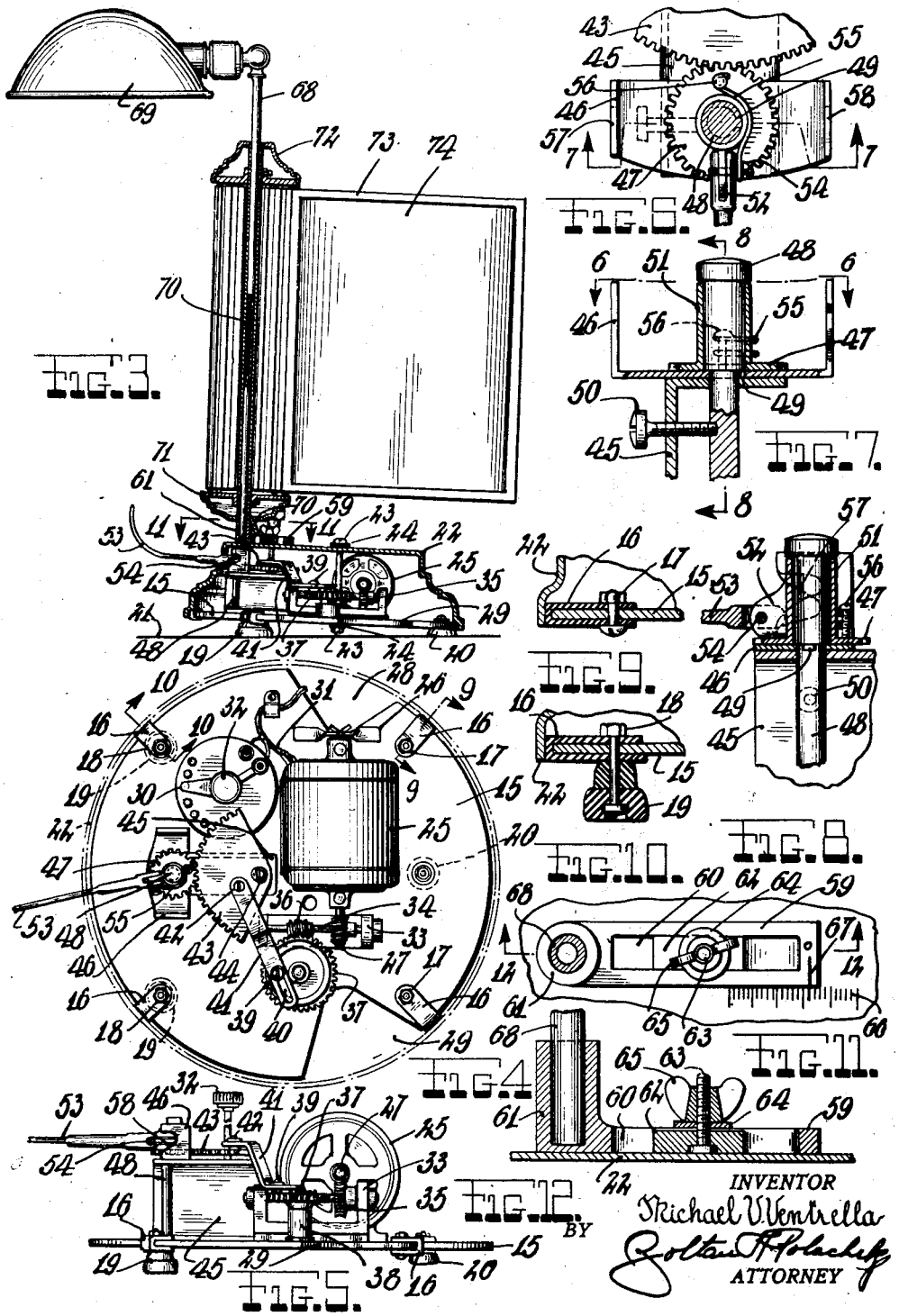

Patented Apr. 17, 1928.

1,666,274

UNITED STATES PATENT OFFICE.

MICHAEL V. VENTRELLA, OF NEW YORK, N. Y.

AUTOMATIC ROTARY BOOK-DISPLAY DEVICE.

Application filed April 18, 1927. Serial No. 184,591.

This invention relates generally to advertising devices, and has more particular reference to an automatic rotary panel display.

The invention has for an object the provision of an automatic rotary panel display, which is positive in action, and at the same time neat and attractive in appearance.

The invention has for a further object the provision of an automatic rotary panel display, which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

Referring to the accompanying drawings forming a material part of this disclosure:

Fig. 1 is a plan view of a device constructed according to this invention.

Fig. 2 is a front view thereof.

Fig. 3 is a vertical sectional view, taken on the line 3—3 of Fig. 2, certain parts not being shown in section to avoid confusion.

Fig. 4 is an enlarged plan view of the base of the device, with certain elements thereon, namely all elements beneath the base cover.

Fig. 5 is a side elevational view of the parts shown in Fig. 4.

Fig. 6 is a horizontal sectional view taken on the line 6—6 of Fig. 7, and disclosing a fragmentary portion of Fig. 4 on an enlarged scale.

Fig. 7 is a vertical sectional view, taken on the line 7—7 of Fig. 6, certain parts not being shown in section.

Fig. 8 is a vertical sectional view, taken on the line 8—8 of Fig. 7, certain parts not being shown in section, and a certain finger raising cam being projected in dot dash lines into this view for comparison with the finger lowering cam in this view.

Fig. 9 is a vertical sectional view, taken on the line 9—9 of Fig. 4.

Fig. 10 is a vertical sectional view, taken on the line 10—10 of Fig. 4.

Fig. 11 is an enlarged fragmentary sectional view, taken on the line 11—11 of Fig. 3.

Fig. 12 is a vertical sectional view, taken on the line 12—12 of Fig. 11, certain parts not being shown in section.

Fig. 13 is a horizontal sectional view, taken on the line 13—13 of Fig. 2.

Fig. 14 is a perspective view of the parts shown in Figs. 6, 7, and 8.

The reference numeral 15 indicates generally a base plate, having four rubber clips 16 equidistantly spaced along the periphery thereof, the rear two of these clips being secured to the base plate by short bolts and nuts 17, and the front two of these clips being secured to the base plate by long bolts and nuts 18 which also clamp rubber feet 19 to the bottom of the base plate. A third rubber foot 20 is secured to the bottom of the base plate between the clips 16 with the bolts 17, and this foot 20 is of smaller height than the feet 19 so that the base plate stands obliquely backwards on a surface 21.

A fancy cover 22 engages with its lower end against the clip 16, and is held against displacement by a bolt and nut 23 provided with a rubber washer 24 beneath the head of the bolt and beneath the nut. Mounted on the base plate 15, and within the cover 22 is an electric motor 25 provided with a fan 26 at one end and a worm 27 at the other end. The base plate 15 is formed with a cutout 28 near the fan 26, and another cutout 29 remote from the fan. A rheostat 30 is also mounted on the base plate, and connected by wires 31 to the electric motor 25 and a source of current, and an operating knob 32 for controlling the rheostat projects through the cover 22.

A standard 33 from the base plate 15, supports a shaft 34 provided with a worm wheel 35 meshing with the worm 27, and with a worm pinion 36 meshing with a worm gear 37 supported by another standard 38. A screw 39 projects from the gear 37, and engages in an elongated slot 40 in a link 41 pivotally connected, as at 42, to an arcuate toothed member 43, pivoted as at 44 to another standard 45. A U-shaped cam member 46 rests on the standard 45, and a gear 47 rests on the U-shaped member, while a pin 48 passes through the gear 47 and the U-shaped member rotatably holding the gear 47 which meshes with the teeth of arcuate member 43, and fixedly holding the U-shaped member by means of a key 49 projecting from the pin and engaging the U-shaped member. A set screw 50 threadedly engaged in the standard 45, abuts the pin 48, holding it against rotation. The gear 47 is provided with an extended hub 51 having a projecting tongue 52 to which a finger 53 is hingedly secured by screw 54, while a spring 55 has one end engaged beneath the head of the screw 54 to urge it outwards, thus urging the finger against the tongue so that frictionally the finger maintains any position to which it is forced, and the other end of the spring 55 is secured by screw 56 to the side of gear 47. One of the arms of the U-shaped member 46 is formed with a finger lowering cam surface 57, and the other with a finger raising cam surface 58.

A bracket 59 formed with an elongated aperture 60, and a pole support 61, is positioned on the top of the cover 22. A block 62 is brazed to the top of the cover 22 and engages in the elongated aperture 60, and is provided with a projecting stud 63, a washer 64 on the stud and a wing nut 65 engaged on the stud over the washer, so that the bracket 59 may be moved to a desirable position, and thus clamped by tightening the wing nut 65. A scale 66 is formed on the cover 22, adjacent the bracket 59, and a co-acting mark 67 is formed on the bracket.

A hollow post 68 projects from the pole support 61, and is provided at the top with an illuminating lamp 69, the electric wires 70 therefor passed through the interior of the post 68, emerging near the bottom thereof, and connecting with a supply current. A bottom and top leaf support, namely 71 and 72 respectively, are rotatably secured to the post 68, and support a plurality of leaf frames 73 with leaves 74. These leaf frames are so arranged that their inner ends are pivoted, and due to the obliquely backwards slope of the post 68, assume a position as shown on the drawing, that is with the front two leaf frames substantially in a plane, and as the leaf frames are turned, always the front two leaves assume the same position. The finger 53 projects through a slot 75 in the cover 22.

The operation of the device consists in starting the motor 25, and by means of knob 32 adjusting the speed thereof as desired. The fan 26 acts to ventilate the space beneath cover 22 to keep the motor from over-heating. The worm 27 transmits the rotation of the motor to wheel 35, worm 36 and wheel 37. The screw 39 from wheel 37, and in slot 40 periodically causes the link 41 to oscillate, oscillating arcuate member 43, gear 47, and the finger 53. As the finger 53 engages the finger raising cam surface 58 it is moved upwards, and thereafter as it engages the finger lowering cam surface 57 it is moved downwards. The wing nut 65 is loosened, and the bracket 59 moved to a position that when the finger 53 is moved upwards it engages behind the front right hand leaf frame 73, thereafter the wing nut is tightened to secure the bracket in the adjusted position. The operation of the finger 53 now causes a period turning of the leaf frames 73, and as before explained the front two leaf frames always assume the same position. The lamp 69 may be lighted to illuminate the front two leaves in the leaf frames.

The rubber feet 19 and 20, the clips 16 and the washers 24 act to dampen vibration and noises of the running motor, so that the device is not noisy.

It is to be understood that my device is not limited only to turn display books, but may be used to display and turn any other suitable objects, such as photographs, pictures, signs, etc., and objects which may be enclosed in suitable frames.

While I have illustrated and described the preferred form, construction, and arrangement of the several elements employed, it will be understood that the device is nevertheless, susceptible of considerable modification therein, and I therefore reserve the right and privilege of resorting to all such changes as may be fairly embodied with the spirit and scope of the invention as claimed.

Having thus described my invention, what I claim as new and desire to secure by United States Letters Patent is:

1. An advertising device, comprising a base with feet of such height so as to tilt backwardly, a cover therefor, a bracket adjustably secured on the cover, a projecting post, supported by the bracket, a top and bottom leaf holder on the post, leaves supported from the leaf holders, and due to the obliquely backward tilt of the base, and the post thereon, the leaves assume a position with the front two leaves substantially in a plane, and a leaf turning device on the base and beneath the cover, and having a projecting finger adapted to turn the said leaves periodically in succession.

2. An advertising device, comprising a base with feet of such height so as to tilt backwardly, a cover therefor, vibrationally insulated therefrom by means of rubber clips, a bracket adjustably secured on the cover, a projecting post supported by the bracket, a top and bottom leaf holder on the post, leaves supported from the leaf holders, and due to the obliquely backward tilt of the base, and the post thereon, the leaves assume a position with the front two leaves substantially in a plane, and a leaf turning device on the base and beneath the cover, and having a projecting finger adapted to turn the said leaves periodically in succession.

3. An advertising device, comprising a base with feet of such height so as to tilt backwardly, a cover thereof, a bracket adjustably secured on the cover, by means of a block secured to the cover, engaging in an elongated slot in the bracket, and provided with a projecting stud with a washer and wing nut thereon, a projecting post supported by the bracket, a top and bottom leaf holder on the post, leaves supported from the leaf holders, and due to the obliquely backward tilt of the base, and the post thereon, the leaves assume a position with the front two leaves substantially in a plane, and a leaf turning device on the base and beneath the cover, and having a projecting finger adapted to turn the said leaves periodically in succession, the said bracket being adjustably mounted so as to allow adjustment to adapt the finger to engage behind one leaf at a time.

4. An advertising device, comprising a base with feet of such height so as to tilt backwardly, a cover therefor, a bracket adjustably secured on the cover, a projecting post supported by the bracket, and supporting an illuminating lamp, a top and bottom leaf holder on the post, leaves supported from the leaf holders, and due to the obliquely backward tilt of the base, and the post thereon, the leaves assume a position with the front two leaves substantially in a plane, and a leaf turning device on the base and beneath the cover, and having a projecting finger adapted to turn the said leaves periodically in succession.

5. An advertising device, comprising a base with feet of such height so as to tilt backwardly, a cover therefor, a projecting post mounted on said cover, a top and bottom leaf holder on the post, leaves supported from the leaf holders, and due to the obliquely backward tilt of the base, and the post thereon, the leaves assume a position with the front two leaves substantially in a plane, and a leaf turning device on the base and beneath the cover, and having a projecting finger adapted to turn the said leaves periodically in succession, said leaf turning device consisting of a motor, a worm on the shaft thereof, a standard from the base, a shaft in the standard, a worm wheel on the shaft, and meshing with the worm, a second worm, and positioned on the shaft of the standard, a second standard from the base, a second worm wheel on the latter standard, and meshing with the second worm, a screw projecting from the side of the second worm wheel, a link having an elongated aperture engaged by the screw, a toothed arcuate member pivotally mounted on a third standard from the base, the end of the link being connected to the arcuate member, a U-shaped cam member resting on the third standard, a gear with a hub extension thereon, a pin with a key projection rotatably supporting the last mentioned gear, and fixedly holding the U-shaped member, the last mentioned gear meshing with the teeth of the arcuate member, a tongue projecting from the said hub extension, said finger being frictionally pivoted to the tongue, and one of the arms of the U-shaped member being formed with a finger raising cam surface, the other arm with a finger lowering cam surface.

6. An advertising device, comprising a base with feet of such height so as to tilt backwardly, a cover therefor, a projecting post mounted on said cover, a top and bottom leaf holder on the post, leaves supported from the leaf holders, and due to the obliquely backward tilt of the base, and the post thereon, the leaves assume a position with the front two leaves substantially in a plane, and a leaf turning device on the base and beneath the cover, and having a projecting finger adapted to turn the said leaves periodically in succession, said leaf turning device consisting of a motor, a worm on the shaft thereof, a standard from the base, a shaft in the standard, a worm wheel on the shaft, and meshing with the worm, a second worm, and positioned on the shaft of the standard, a second standard from the base, a second worm wheel on the latter standard, and meshing with the second worm, a screw projecting from the side of the second worm wheel, a link having an elongated aperture engaged by the screw, a toothed arcuate member pivotally mounted on a third standard from the base, the end of the link being connected to the arcuate member, a U-shaped cam member resting on the third standard, a gear with a hub extension thereon, a pin with a key projection rotatably supporting the last mentioned gear, and fixedly holding the U-shaped member, the last mentioned gear meshing with the teeth of the arcuate member, a tongue projecting from the said hub extension, said finger being frictionally pivoted to the tongue, and projecting from the cover of the base, and one of the arms of the U-shaped member being formed with a finger raising cam surface, the other arm with a finger lowering cam surface.

7. An advertising device comprising a base member, a projecting post mounted on said base member disposed at an inclination to a horizontal plane, top and bottom leaf holders on said post, leaves pivotally supported by said leaf holders disposed in inclined planes and adapted to assume a position with the front leaves substantially in a common plane, and a leaf turning device mounted in said base member comprising a finger adapted to turn said leaves periodically in succession.

8. An advertising device comprising a base plate, feet on said base plate adapted to retain the same at an inclination to a horizontal plane, a cover member mounted on said base plate, a bracket slidably mounted on said cover, means for securing said bracket in adjusted position, a post mounted on said bracket adapted to be adjustably positioned by manipulation thereof, leaf holders on said post, leaves pivotally attached to said holders adapted to be retained by said post in inclined position for causing the two front leaves to recline substantially in a common plane, and mechanism for turning said leaves comprising a finger mounted within said cover and disposed through a slot therein, said leaves being adapted to be positioned relative to said finger by manipulation of said bracket for rendering the finger capable of engaging a single leaf at each operation.

9. A device of the class described comprising a base, a standard in said base for supporting leaves, a finger pivotally and rotatively mounted in said base, means for frictionally retaining said finger in an upper and lower position, cam elements for moving said finger to an upper position for engaging a leaf, when said finger is in one position, a cam element for moving said finger downwardly when said finger is in another position, and mechanism in said base for oscillating said finger.

In testimony whereof I have affixed my signature.

MICHAEL V. VENTRELLA.